United States Patent
Gomi et al.

(10) Patent No.: US 8,265,418 B2
(45) Date of Patent: Sep. 11, 2012

(54) IMAGE PROCESSING APPARATUS, IMAGE PROCESSING METHOD, AND COMPUTER-READABLE STORAGE MEDIUM FOR CALCULATING A DEPTH VALUE OF A SUBJECT IN AN IMAGE

(75) Inventors: Shinichiro Gomi, Chiba (JP); Yasunari Hatasawa, Tokyo (JP); Masami Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 406 days.

(21) Appl. No.: 12/561,566

(22) Filed: Sep. 17, 2009

(65) Prior Publication Data

US 2010/0074521 A1    Mar. 25, 2010

(30) Foreign Application Priority Data

Sep. 19, 2008   (JP) ................. P2008-240335

(51) Int. Cl.
*G06K 9/40* (2006.01)
(52) U.S. Cl. ........................................ 382/274
(58) Field of Classification Search .............. 382/274
See application file for complete search history.

(56) References Cited

U.S. PATENT DOCUMENTS

| | | | |
|---|---|---|---|
| 6,900,799 B2 | 5/2005 | Takeuchi | |
| 2002/0006222 A1* | 1/2002 | Inagaki et al. | 382/181 |
| 2003/0189568 A1* | 10/2003 | Alkouh | 345/422 |
| 2005/0254702 A1* | 11/2005 | Era | 382/154 |
| 2007/0262985 A1* | 11/2007 | Watanabe et al. | 345/420 |
| 2007/0273686 A1* | 11/2007 | Watanabe et al. | 345/419 |
| 2008/0187216 A1* | 8/2008 | Hasegawa | 382/162 |
| 2009/0022396 A1* | 1/2009 | Watanabe et al. | 382/167 |
| 2010/0073521 A1* | 3/2010 | Gomi et al. | 348/235 |
| 2010/0080485 A1* | 4/2010 | Chen et al. | 382/266 |
| 2011/0211754 A1* | 9/2011 | Litvak et al. | 382/165 |

FOREIGN PATENT DOCUMENTS

JP   2002-197486   7/2002

* cited by examiner

*Primary Examiner* — Jason M Repko
*Assistant Examiner* — Gandhi Thirugnanam
(74) *Attorney, Agent, or Firm* — Finnegan, Henderson, Farabow, Garrett & Dunner, L.L.P.

(57) ABSTRACT

An image processing apparatus includes: means for extracting, for each pixel of an image, a high-frequency component as focus information from a brightness signal for a neighboring pixel; means for integrating, for each pixel, the focus information on the neighboring pixel; means for replacing the focus information on each pixel with a value obtained using the focus information on the neighboring pixel greater than the focus information on that pixel to generate dark area focus information; means for integrating the brightness signals of each pixel and the neighboring pixel to extract an illumination component; means for calculating a depth value of each pixel using a coefficient based on the illumination component; means for normalizing the depth value of each pixel; means for controlling the normalized depth value using a tone curve; means for detecting a saturation of each pixel; and means for controlling the controlled depth value using the saturation.

20 Claims, 11 Drawing Sheets

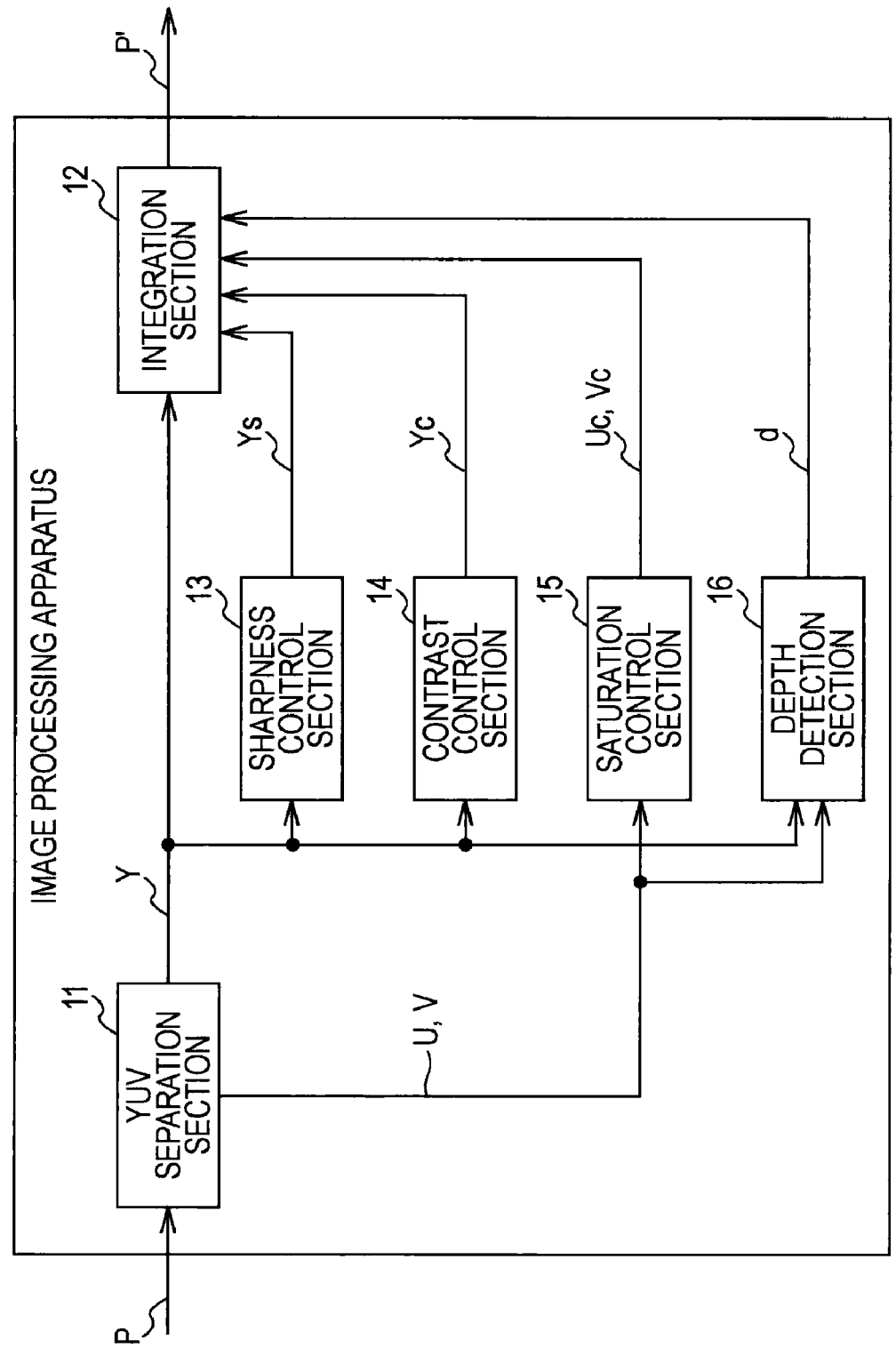

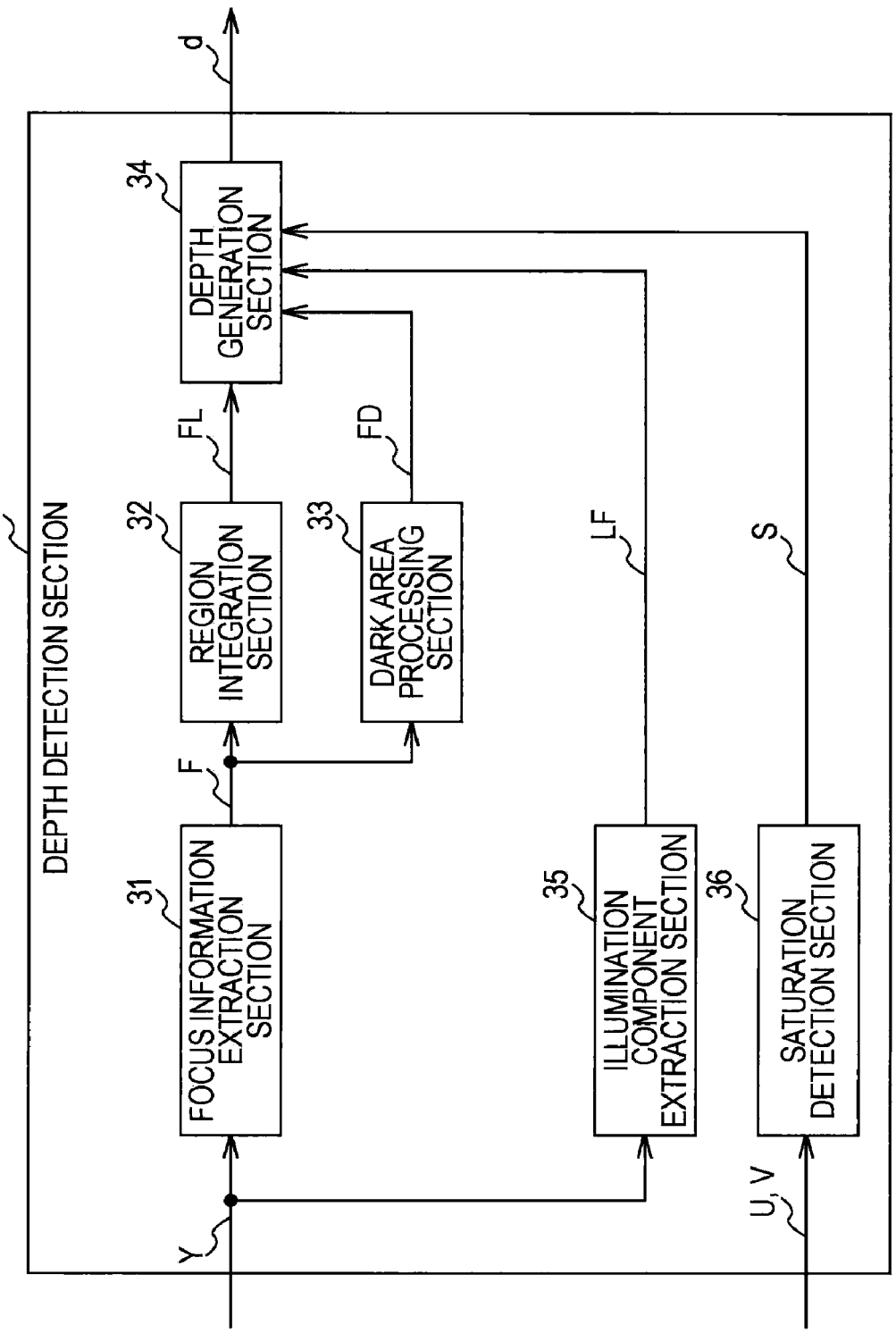

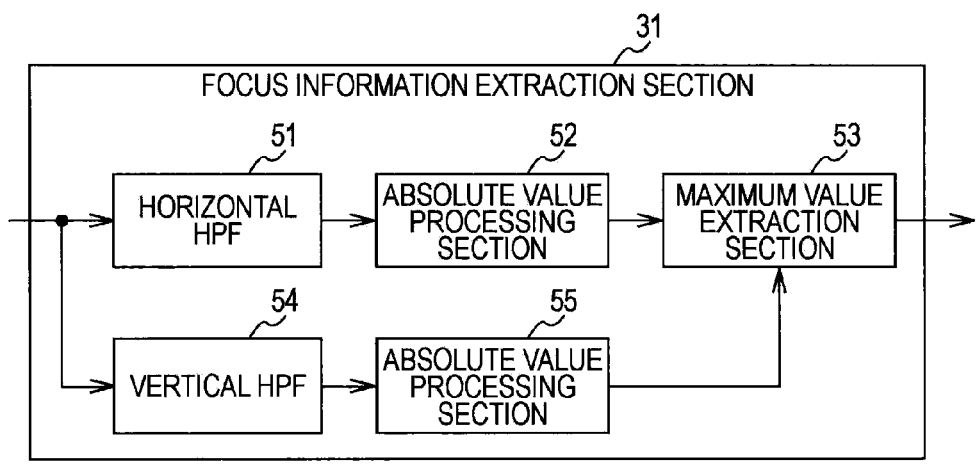

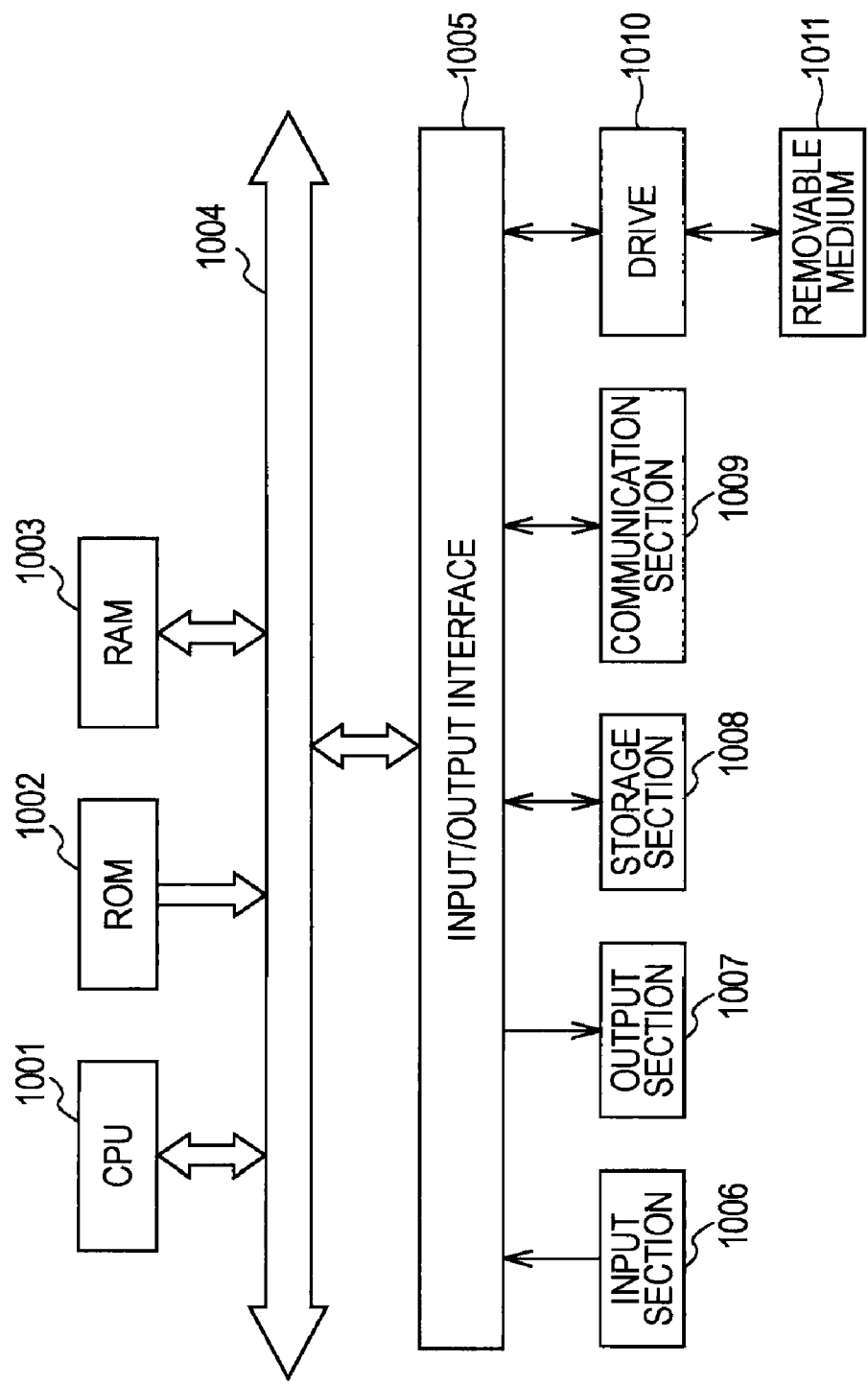

IMAGE PROCESSING APPARATUS, IMAGE PROCESSING METHOD, AND COMPUTER-READABLE STORAGE MEDIUM FOR CALCULATING A DEPTH VALUE OF A SUBJECT IN AN IMAGE

BACKGROUND OF THE INVENTION

1. Field of the Invention

The present invention relates to an image processing apparatus, an image processing method, and a program, and in particular to an image processing apparatus, an image processing method, and a program capable of accurately calculating a depth value of a subject in an image to process the image on the basis of the obtained depth value.

2. Description of the Related Art

A technique for setting a depth value for each subject in an image to perform image processing in accordance with the set depth value is proposed (Japanese Unexamined Patent Application Publication No. 2002-197486). A process for extracting a depth value of a subject in an image to perform the above image processing in correspondence with the extracted depth value is also proposed.

SUMMARY OF THE INVENTION

In the case where a depth value is detected on the basis of contour components or high-frequency components of an image which are often based only on brightness information, however, a depth value may not be calculated accurately and thus the image may not be processed appropriately, because there are extremely small contour components and high-frequency components in a flat area of the image. Also in a dark area of the image where there are small contour components and high-frequency components, a depth value may not be calculated accurately and thus the image may not be processed appropriately.

It is therefore desirable to set an accurate depth value in a flat area of an image such as a dark area.

According to an embodiment of the present invention, there is provided an image processing apparatus including: focus information extraction means for extracting, for each pixel of an input image, a high-frequency component as focus information from a brightness signal for a neighboring pixel; region integration means for integrating, for each pixel, the focus information on the neighboring pixel to generate integrated focus information; dark area processing means for replacing a value of the focus information on each pixel with a value obtained on the basis of a value of the focus information on the neighboring pixel that is greater than the value of the focus information on that pixel to generate dark area focus information on the input image; illumination component extraction means for integrating the brightness signal for each pixel with the brightness signal for the neighboring pixel to extract an illumination component; bright area/dark area integration means for calculating a depth value of each pixel through a product-sum operation of the integrated focus information and the dark area focus information using a coefficient based on the illumination component; normalization means for normalizing the depth value of each pixel; tone curve control means for controlling the depth value normalized by the normalization means in accordance with a tone curve; saturation detection means for detecting a saturation of each pixel; and saturation control means for controlling the depth value that has been controlled in accordance with the tone curve by the tone curve control means on the basis of the saturation.

The image processing apparatus may further include perspective control means for controlling, for each pixel of the input image, a brightness and a color difference signal on the basis of a coefficient based on the depth value that has been controlled in accordance with the tone curve by the tone curve control means.

The image processing apparatus may further include: sharpness control means for controlling a sharpness of the brightness; contrast control means for controlling a contrast of the brightness; and color difference control means for controlling a color difference signal for each pixel, and the perspective control means may control the brightness on the basis of the coefficient using the brightness of each pixel, the brightness controlled by the sharpness control means, and the brightness controlled by the contrast control means, and controls the color difference signal on the basis of the coefficient based on the depth value using the color difference signal and the color difference signal controlled by the color difference control means.

According to another embodiment of the present invention, there is provided an image processing method including the steps of: extracting, for each pixel of an input image, a high-frequency component as focus information from a brightness signal for a neighboring pixel; integrating, for each pixel, the focus information on the neighboring pixel to generate integrated focus information; replacing a value of the focus information on each pixel with a value obtained on the basis of a value of the focus information on the neighboring pixel that is greater than the value of the focus information on that pixel to generate dark area focus information on the input image; integrating the brightness signal for each pixel with the brightness signal for the neighboring pixel to extract an illumination component; calculating a depth value of each pixel through a product-sum operation of the integrated focus information and the dark area focus information using a coefficient based on the illumination component; normalizing the depth value of each pixel; controlling the depth value normalized in the normalization step in accordance with a tone curve; detecting a saturation of each pixel; and controlling the depth value that has been controlled in accordance with the tone curve in the tone curve control step on the basis of the saturation.

According to still another embodiment of the present invention, there is provided a program for causing a computer to execute a process including the steps of: extracting, for each pixel of an input image, a high-frequency component as focus information from a brightness signal for a neighboring pixel; integrating, for each pixel, the focus information on the neighboring pixel to generate integrated focus information; replacing a value of the focus information on each pixel with a value obtained on the basis of a value of the focus information on the neighboring pixel that is greater than the value of the focus information on that pixel to generate dark area focus information on the input image; integrating the brightness signal for each pixel with the brightness signal for the neighboring pixel to extract an illumination component; calculating a depth value of each pixel through a product-sum operation of the integrated focus information and the dark area focus information using a coefficient based on the illumination component; normalizing the depth value of each pixel; controlling the depth value normalized in the normalization step in accordance with a tone curve; detecting a saturation of each pixel; and controlling the depth value that has been controlled in accordance with the tone curve in the tone curve control step on the basis of the saturation.

According to an embodiment of the present invention, for each pixel of an input image, a high-frequency component is extracted as focus information from a brightness signal for a neighboring pixel; for each pixel, the focus information on the neighboring pixel is integrated to generate integrated focus information; a value of the focus information on each pixel is replaced with a value obtained on the basis of a value of the focus information on the neighboring pixel that is greater than the value of the focus information on that pixel to generate dark area focus information on the input image; the brightness signal for each pixel is integrated with the brightness signal for the neighboring pixel to extract an illumination component; a depth value of each pixel is calculated through a product-sum operation of the integrated focus information and the dark area focus information using a coefficient based on the illumination component; the depth value of each pixel is normalized; the normalized depth value is controlled in accordance with a tone curve; a saturation of each pixel is detected; and the depth value that has been controlled in accordance with the tone curve is controlled on the basis of the saturation.

The image processing apparatus according to the present invention may be an independent apparatus or a functional block that performs image processing.

According to an embodiment of the present invention, it is possible to accurately calculate a depth value of a subject in an image.

BRIEF DESCRIPTION OF THE DRAWINGS

FIG. 1 is a block diagram showing an exemplary configuration of an image processing apparatus according to an embodiment of the present invention;

FIG. 2 is a block diagram showing an exemplary configuration of a depth detection section of FIG. 1;

FIG. 3 is a block diagram showing an exemplary configuration of a focus information extraction section of FIG. 2;

FIG. 4A is a diagram showing an exemplary configuration of a horizontal HPF;

FIG. 4B is a diagram showing an exemplary configuration of a horizontal HPF and a vertical HPF;

FIG. 16 is a block diagram showing an exemplary configuration of a personal computer.

DESCRIPTION OF THE PREFERRED EMBODIMENTS

[Exemplary Configuration of Image Processing Apparatus]

Figure 5:
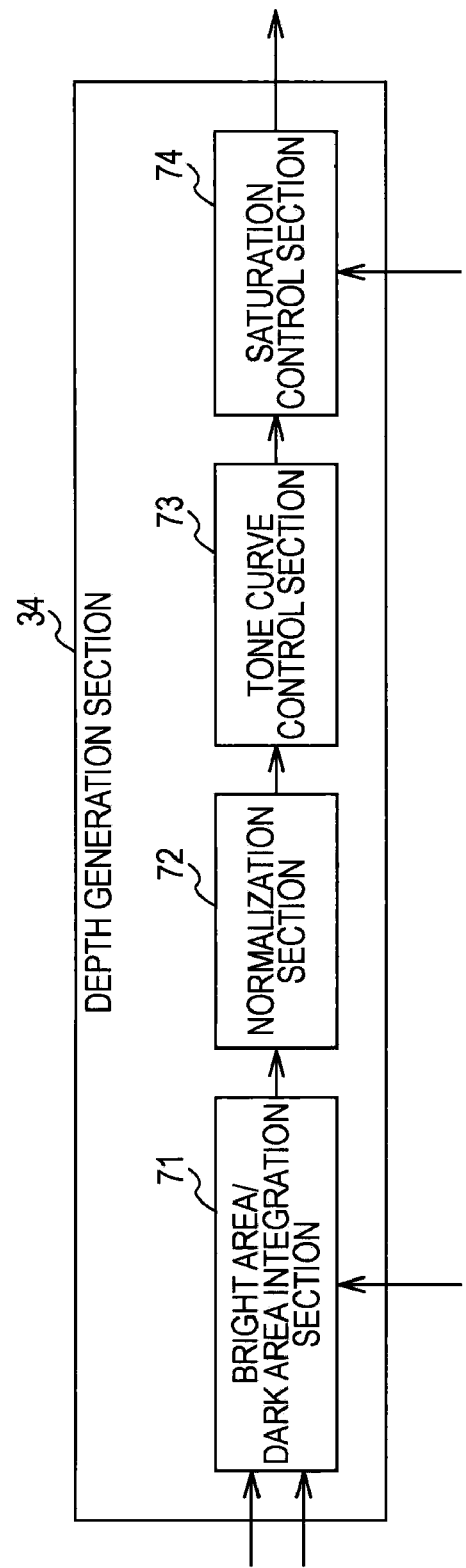
FIG. 5 is a block diagram showing an exemplary configuration of a depth generation section of FIG. 2.

FIG. 1 shows an exemplary configuration of an image processing apparatus according to an embodiment of the present invention.

As shown in FIG. 1, an image processing apparatus 1 includes a YUV separation section 11, an integration section 12, a sharpness control section 13, a contrast control section 14, a saturation control section 15, and a depth detection section 16. The image processing apparatus 1 obtains from an input image the expanse of a scene captured in the image, that is, a depth value of each pixel, and processes the input image in accordance with the obtained depth value to improve the image quality.

The YUV separation section 11 converts the input image in the form of an RGB signal, for example, into a YUV signal pixel by pixel, and separates the YUV signal into a brightness signal Y and color difference signals U, V. The YUV separation section supplies the brightness signal Y to the integration section 12, the sharpness control section 13, the contrast control section 14, and the depth detection section 16. The YUV separation section 11 also supplies the color difference signals U, V to the saturation control section 15 and the depth detection section 16. If the input image is already in the form of a YUV signal, the YUV separation section 11 simply separates the input image into a brightness signal Y and color difference signals U, V.

The sharpness control section 13 enhances high-frequency components of the input brightness signal Y pixel by pixel to generate a sharpness-controlled brightness signal Ys, and supplies the sharpness-enhanced brightness signal Ys to the integration section 12.

The contrast control section 14 enhances the contrast of the input brightness signal Y pixel by pixel to generate a contrast-enhanced brightness signal Yc, and supplies the contrast-enhanced brightness signal Yc to the integration section 12.

The saturation control section 15 multiplies the values of the color difference signals U, V by a predetermined coefficient pixel by pixel to generate saturation-enhanced color difference signals Uc, Vc, and supplies the saturation-enhanced color difference signals Uc, Vc to the integration section 12.

The depth detection section 16 obtains a depth value d of each pixel on the basis of the brightness signal Y and the color difference signals U, V, and supplies the depth value d to the integration section 12. An exemplary configuration of the depth detection section 16 will be discussed in detail later with reference to FIG. 2.

The integration section 12 integrates the brightness signals Y, Yc, Ys and the color difference signals Uc, Vc on the basis of the depth value d in such a manner that the perspective of the image is enhanced, and outputs a resulting integrated signal as an output image P'.

[Exemplary Configuration of Depth Detection Section]

An exemplary configuration of the depth detection section 16 is next described with reference to FIG. 2.

The depth detection section 16 includes a focus information extraction section 31, a region integration section 32, a dark area processing section 33, a depth generation section 34, an illumination component extraction section 35, and a saturation detection section 36. The depth detection section 16 obtains a depth value d of each pixel on the basis of the brightness signal Y and the color difference signals U, V, and supplies the depth value d to the integration section 12.

The focus information extraction section 31 extracts high-frequency components from the brightness signal Y by applying a horizontal HPF (High Pass Filter) and a vertical HPF to the brightness signal Y, and supplies the extracted high-frequency components as focus information F to the region integration section 32 and the dark area processing section 33. An exemplary configuration of the focus information extraction section 31 will be discussed in detail later with reference to FIG. 3.

The region integration section 32 may include an LPF (Low Pass Filter). The region integration section 32 smoothens the focus information F to integrate the focus information F so as to approximate a value of the focus information F on each pixel to values of the focus information F on neighboring pixels in order to generate focus information FL, and supplies the focus information FL to the depth generation section 34. The region integration section 32 may have any configuration that enables an integration process for approximating a value of the focus information F for a pixel to values of the focus information F for neighboring pixels. Therefore, the region integration section 32 may include an FIR (Finite Impulse Response Filter), an IIR (Infinite Impulse Response Filter), an E filter, a median filter, or the like besides the LPF.

The dark area processing section 33 compares a value of the focus information F on each pixel with values of the focus information F on neighboring pixels to obtain an average value of values of the focus information F on neighboring pixels that are greater than the value of the focus information F on that pixel. Then, the dark area processing section 33 replaces the value of the focus information F on the target pixel with the obtained average value to make a dark area of the image brighter in order to generate focus information FD, and supplies the focus information FD to the depth generation section 34.

The illumination component extraction section 35 may include an LPF. The illumination component extraction section 35 smoothens the brightness signal Y to approximate a value of the brightness signal Y for a pixel to values of the brightness signal Y for neighboring pixels to extract illumination components LF, and supplies the illumination components LF to the depth generation section 34.

The saturation detection section 36 detects a saturation S on the basis of the color difference signals U, V, and supplies the detected saturation S to the depth generation section 34.

The depth generation section 34 generates a depth value d on the basis of the focus information FL, FD, the illumination components LF, and the saturation S, and outputs the depth value d. An exemplary configuration of the depth generation section 34 will be discussed in detail later with reference to FIG. 5.

[Exemplary Configuration of Focus Information Extraction Section]

An exemplary configuration of the focus information extraction section 31 is next described with reference to FIG. 3.

The focus information extraction section 31 includes a horizontal HPF 51, an absolute value processing section 52, a maximum value extraction section 53, a vertical HPF 54, and an absolute value processing section 55. The focus information extraction section 31 extracts high-frequency components of the brightness signal Y, and outputs the extracted high-frequency components as focus information F.

The horizontal HPF 51 may be an HPF that extracts horizontal high-frequency components as indicated in FIG. 4A, for example. The horizontal HPF 51 extracts horizontal high-frequency components YH of the input brightness signal Y, and supplies the high-frequency components YH to the absolute value processing section 52.

The absolute value processing section 52 obtains an absolute value of the high-frequency components YH extracted as horizontal high-frequency components, and supplies the obtained absolute value to the maximum value extraction section 53.

The vertical HPF 54 may be an HPF that extracts vertical high-frequency components as indicated in FIG. 4B, for example. The vertical HPF 54 extracts vertical high-frequency components YV of the input brightness signal Y, and supplies the high-frequency components YV to the absolute value processing section 52.

The absolute value processing section 55 obtains an absolute value of the high-frequency components YV extracted as vertical high-frequency components, and supplies the obtained absolute value to the maximum value extraction section 53.

The maximum value extraction section 53 extracts maximum values of the high-frequency components YH, YV, and outputs the extracted maximum values as focus information F.

[Exemplary Configuration of Depth Generation Section]

An exemplary configuration of the depth generation section 34 is next described with reference to FIG. 5.

The depth generation section 34 includes a bright area/dark area integration section 71, a normalization section 72, a tone curve control section 73, and a saturation control section 74. The depth generation section 34 generates a depth value d on the basis of the focus information FL, FD, the illumination components LF, and the saturation S, and outputs the depth value d.

The bright area/dark area integration section 71 synthesizes the brightness signal YL from the region integration section 32 and the brightness signal YD from the dark area processing section 33 at a ratio based on the illumination component LF supplied from the illumination component extraction section 35 to integrate a bright area and a dark area of the brightness signals, and supplies a resulting synthesized signal g to the normalization section 72.

The normalization section 72 normalizes the synthesized signal g supplied from the bright area/dark area integration section 71, and supplies a resulting normalized synthesized signal g' to the tone curve control section 73.

The tone curve control section 73 controls the normalized synthesized signal g' in accordance with a preset tone curve to generate a depth value dg, and supplies the depth value dg to the saturation control section 74.

The saturation control section 74 multiplies the depth value dg supplied from the tone curve control section 73 by a coefficient set on the basis of the saturation S supplied from the saturation detection section 36 to generate a depth value d, and supplies the depth value d to the integration section 12.

[Image Processing Performed by Image Processing Apparatus]

Image processing performed by the image processing apparatus 1 of FIG. 1 is next described with reference to the flowchart of FIG. 6.

In step S11, the YUV separation section 11 determines whether or not a new image has been supplied. The YUV separation section 11 repeats the same process until a new image is supplied. If a new image is input in step S11, for example, the process proceeds to step S12.

In step S12, the YUV separation section 11 converts the input image into a YIN signal pixel by pixel, separates the YUV signal into a brightness signal Y and color difference signals U, V, and supplies the brightness signal Y to the integration section 12, the sharpness control section 13, the contrast control section 14, and the depth detection section 16 and the color difference signals U, V to the saturation control section 15 and the depth detection section 16.

In step S13, the sharpness control section 13 enhances the sharpness of the brightness signal Y for each pixel of the input image through a contour enhancement process or the like to generate a brightness signal Ys, and supplies the brightness signal Ys to the integration section 12.

In step S14, the contrast control section 14 enhances the contrast of the brightness signal Y for each pixel of the input image through a calculation process represented by the following formula (1) to generate a brightness signal Yc, and supplies the brightness signal Yc to the integration section 12.

$$Yc=(Y-Ymin)/(Ymax-Ymin) \quad (1)$$

In the formula (1), Y represents the value of the brightness signal for each pixel of the input image, Ymin represents the minimum value of the brightness signal Y in the input image, Ymax represents the maximum value of the brightness signal Y in the input image, and Yc represents the value of the contrast-controlled brightness signal.

That is, through the process of step S14, the contrast control section 14 converts the value of the brightness signal Y into a ratio of the difference between the value of the brightness signal Y and the minimum value Ymin to the difference between the maximum value Ymax and the minimum value Ymin, enhancing the contrast.

In step S15, the saturation control section 15 multiplies each of the values of the color difference signals U, V by a predetermined coefficient κ to enhance the saturation, and supplies color difference signals Uc (=KU), Vc (=κV) to the integration section 12. The predetermined coefficient κ may be set to any desired value.

In step S16, the depth detection section 16 executes a depth detection process to obtain a depth value d of each pixel on the basis of the brightness signal Y and the color difference signals U, V, and supplies the depth value d to the integration section 12.

[Depth Detection Process]

The depth detection process is now described with reference to the flowchart of FIG. 7.

In step S31, the saturation detection section 36 obtains a saturation S on the basis of the supplied color difference signals U, V through calculation represented by the following formula (2), and supplies the saturation S to the depth generation section 34.

$$S=\sqrt{(U^2+V^2)} \quad (2)$$

In the formula, U, V represent the values of the color difference signals. That is, the saturation S is obtained as the square root of the square sum of the values of the color difference signals U, V.

In step S32, the illumination component extraction section 35 smoothens the brightness signal Y to approximate a value of the brightness signal Y for each pixel to values of the brightness signal Y for neighboring pixels to extract illumination components LF, and supplies the illumination components LF to the depth generation section 34. That is, values close to the values of the brightness signal Y for neighboring pixels are extracted as illumination components LF because a bright area has small high-frequency components even if the bright area is in focus.

In step S33, the focus information extraction section 31 executes a focus information extraction process on each pixel to obtain focus information F from the brightness signal Y, and supplies the focus information F to the region integration section 32 and the dark area processing section 33.

[Focus Information Extraction Process]

Figure 8:
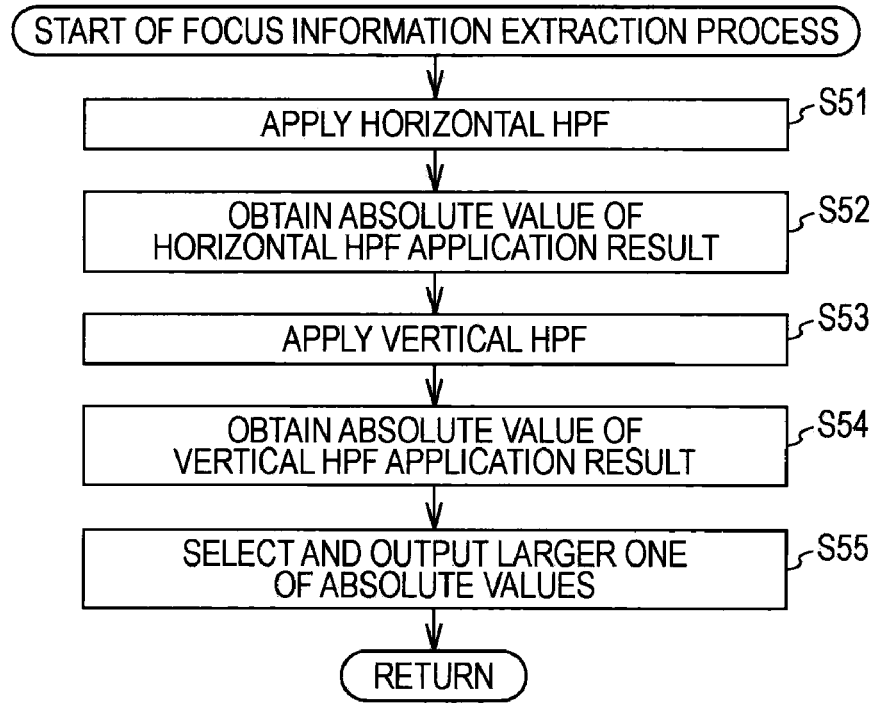
FIG. 8 is a flowchart illustrating a focus information extraction process.

The focus information extraction process is now described with reference to the flowchart of FIG. 8.

In step S51, the horizontal HPF 51 applies a horizontal filtering process as indicated in the left part of FIG. 4, for example, to the input brightness signal Y to extract high-frequency components YH, and supplies the high-frequency components YH to the absolute value processing section 52.

In step S52, the absolute value processing section 52 obtains an absolute value of the high-frequency components YH extracted as horizontal high-frequency components, and supplies the obtained absolute value to the maximum value extraction section 53.

In step S53, the vertical HPF 54 applies a vertical filtering process as indicated in the right part of FIG. 4, for example, to the input brightness signal Y to extract high-frequency components YV, and supplies the high-frequency components YV to the absolute value processing section 55.

In step S54, the absolute value processing section 55 obtains an absolute value of the high-frequency components YV extracted as vertical high-frequency components, and supplies the obtained absolute value to the maximum value extraction section 53.

In step S55, the maximum value extraction section 53 extracts the larger one of the high-frequency components YH, YV, and outputs the extracted one of the high-frequency components YH, YV as focus information F to the region integration section 32 and the dark area processing section 33.

Through the above process, the larger one of the horizontal high-frequency components and the vertical high-frequency components of the brightness signal Y is output as focus information F for each pixel of the input image P.

Figure 7:
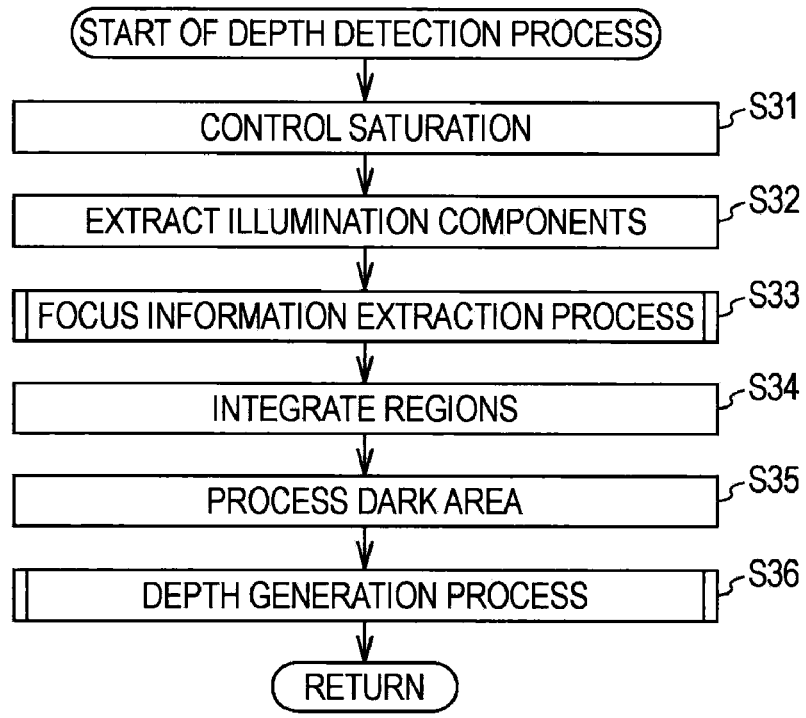
FIG. 7 is a flowchart illustrating a depth detection process.

The description of the flowchart of FIG. 7 is now resumed.

In step S34, the region integration section 32 smoothens the focus information F to approximate a value of the focus information F for a pixel to values of the focus information F for neighboring pixels in order to generate focus information FL, and supplies the focus information FL to the depth generation section 34. That is, through this process, the region integration section 32 smoothens the focus information F such that the entire image appears to be composed of high-frequency components to generate focus information FL, and supplies the focus information FL to the depth generation section 34.

Figure 9:
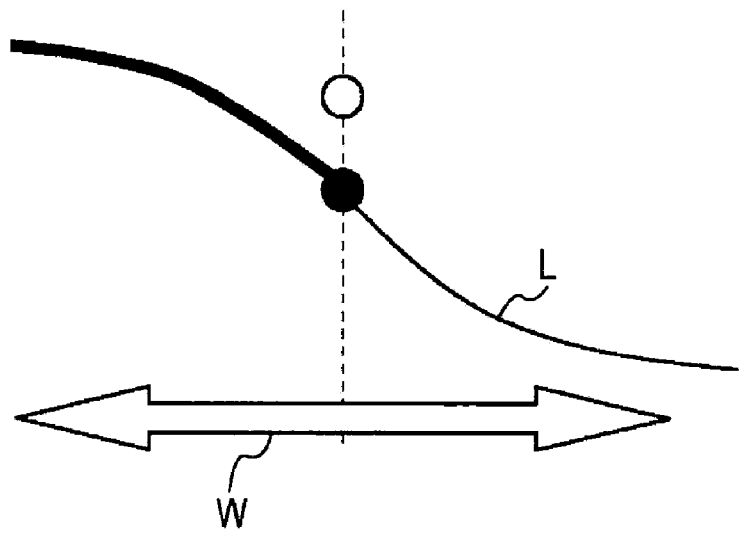
FIG. 9 illustrates operation of a dark area processing section.

In step S35, the dark area processing section 33 compares a value of the focus information F for each pixel with values of the focus information F for neighboring pixels to obtain an average value of values of the focus information F for neighboring pixels that are greater than the value of the focus information F for that pixel to be processed. That is, as shown for example in FIG. 9, the dark area processing section 33 obtains an average value FA (indicated by the white dot in FIG. 9) of values of the focus information F for pixels in a one-dimensional (either vertical or horizontal) range W centered on a pixel to be processed indicated by the black dot in FIG. 9 that are greater than the value of the focus information F for the target pixel as indicated by the thick line. The dark area processing section 33 then replaces the value of the focus information F for that pixel to be processed with the obtained average value FA to generate focus information FD. Through this process, the image is processed to become brighter with the value of the focus information F for each pixel replaced with the average value FA of the values of the focus information F for neighboring pixels that are brighter than that pixel to generate focus information FD. That is, pixels in a dark area of the image are processed to become brighter, for example. In the process performed by the dark area processing section 33, an average value of values of the focus information F for pixels in any predetermined range around a pixel to be processed may be used. For example, the value of the focus information F for a pixel to be processed may be replaced with an average value of values of the focus information F for pixels in a two-dimensional range centered on that pixel to be processed that are greater than the value of the focus information F for that pixel to be processed.

In step S36, the depth generation section 34 executes a depth generation process to generate a depth value d on the basis of the focus information FL, FD, the illumination components LF, and the saturation S, and outputs the depth value d to the integration section 12.

[Depth Generation Process]

Figure 10:
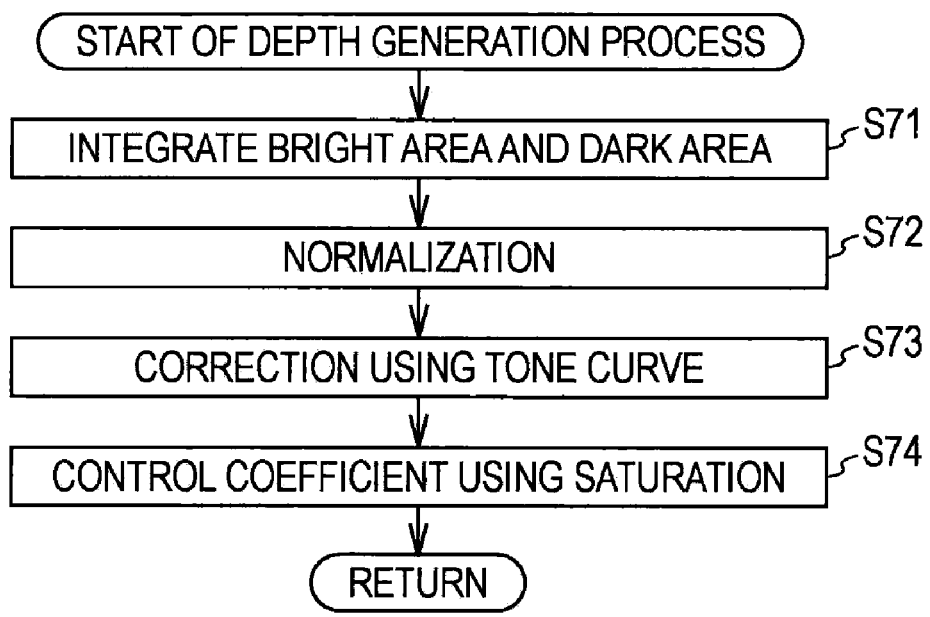
FIG. 10 is a flowchart illustrating a depth generation process.

The depth generation process is now described with reference to the flowchart of FIG. 10.

In step S71, the bright area/dark area integration section 71 synthesizes the brightness signal YL and the brightness signal YD at a ratio based on the illumination components LF through calculation represented by the following formula (3) to generate a synthesized signal g, and supplies the synthesized signal g to the normalization section 72.

$$g = A \times FD + (1-A) \times FL \quad (3)$$

Figure 11:
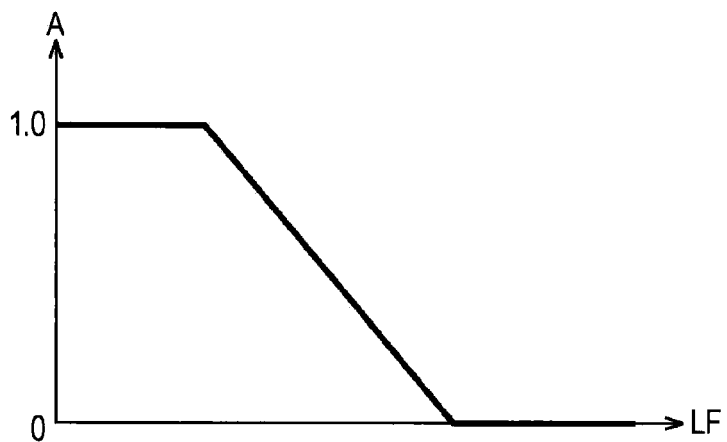
FIG. 11 illustrates the depth generation process.

In the formula, g represents the value of the synthesized signal, FD represents the value of the brightness signal for a dark area, FL represents the value of the brightness signal for a bright area, and A represents a coefficient determined on the basis of the illumination components LF as shown in FIG. 11. That is, the coefficient A is a value from 0 to 1.0, and takes a value of 1.0 when the illumination components LF take a value from 0 to a predetermined value, reduces linearly as the value of the illumination components LF increases, and takes a value of 0 when the illumination components LF take a value exceeding a predetermined value.

Thus, for an image that is bright as a whole with great illumination components LF, the bright area/dark area integration section 71 synthesizes the brightness signal YL for a bright area and the brightness signal YD for a dark area with the ratio of the brightness signal YL for a bright area increased. For an image that is dark as a whole with small illumination components LF, in contrast, the bright area/dark area integration section 71 synthesizes the brightness signal YL for a bright area and the brightness signal YD for a dark area with the ratio of the brightness signal YD for a dark area increased.

As a result, the focus information F is adjusted in accordance with the brightness signal YL with great high-frequency components in the case where the input image P is bright as a whole. In the case where the input image P is dark as a whole, in contrast, the focus information F is adjusted in accordance with the brightness signal YD which has been subjected to dark area processing.

In step S72, the normalization section 72 executes calculation represented by the following formula (4), for example, to normalize the synthesized signal g, and supplies a normalized synthesized signal g' to the tone curve control section 73.

$$g' = (g - gmin)/(gmax - gmin) \quad (4)$$

In the formula, g' represents the value of the normalized synthesized signal, g represents the value of the synthesized signal before being normalized, gmax represents the maximum value of the synthesized signal g for each pixel of the input image, and gmin represents the minimum value of the synthesized signal g for each pixel of the input image.

Figure 12:
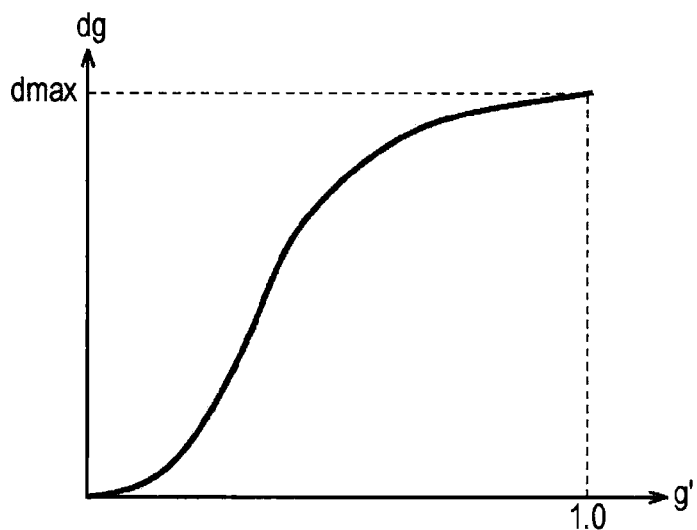
FIG. 12 illustrates a tone curve.

In step S73, the tone curve control section 73 controls the normalized synthesized signal g' in accordance with a tone curve as shown in FIG. 12, for example, to generate a depth value dg, and supplies the depth value dg to the saturation control section 74. In the preset tone curve shown in FIG. 12, the depth value dg increases gently when the normalized synthesized signal g' takes a value around 0 or a value around 1, and increases sharply when the normalized synthesized signal g' takes a value around 0.4. Therefore, the depth value dg is set to be small in the case where the value of the normalized synthesized signal g' is small, and set to be great in the case where the value of the normalized synthesized signal g' is great. The depth value dg takes a value close to either 0 or 1.0 depending on the amplitude of the value of the normalized synthesized signal g', allowing a clear distinction of whether a subject is positioned closer or farther in terms of depth.

Figure 13:
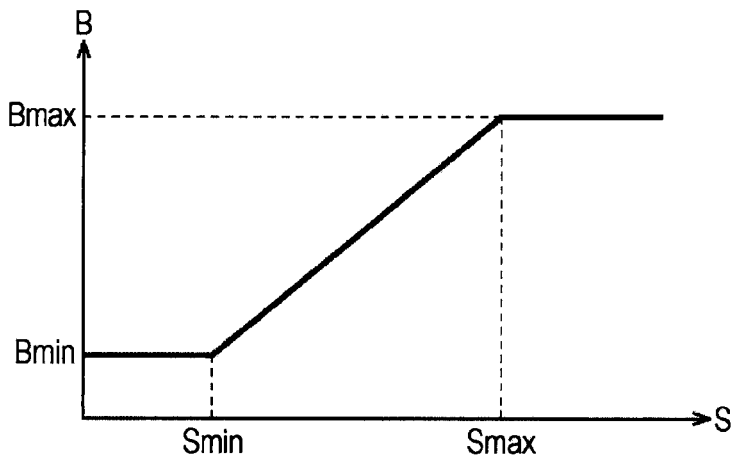
FIG. 13 illustrates the relationship between a saturation S and a coefficient B.

In step S74, the saturation control section 74 multiplies the depth value dg supplied from the tone curve control section 73 by a coefficient B set on the basis of the saturation S supplied from the saturation detection section 36 as shown in FIG. 13 to generate a depth value d which is controlled on the basis of the saturation S. More specifically, the saturation control section 74 executes calculation represented by the following formula (5) to obtain a depth value d, and supplies the obtained depth value d to the integration section 12.

$$d = B \times dg \quad (5)$$

In the formula, d represents the depth value controlled on the basis of the saturation S, B represents the coefficient set on the basis of the saturation S as shown in FIG. 13, and dg represents the depth value before being controlled on the basis of the saturation S.

As shown in FIG. 13, the coefficient B takes a value in a preset range from a minimum value Bmin to a maximum value Bmax, and varies linearly with the saturation S in the input image in a range from a minimum value Smin to a maximum value Smax. That is, the depth value dg before being controlled gives a greater value of the depth value d as the saturation S is greater, and the depth value dg before being controlled gives a smaller value of the depth value d as the saturation S is smaller. Therefore, the depth value d is greater as the saturation S is greater, making it easier to clearly recognize the depth, and the depth value d is smaller as the saturation S is smaller, making it more difficult to recognize the depth.

Through the above process, the depth value d is set on the basis of the synthesized signal g set in accordance with the brightness/darkness of each pixel in the input image, enabling the depth value d to be calculated appropriately.

Figure 6:
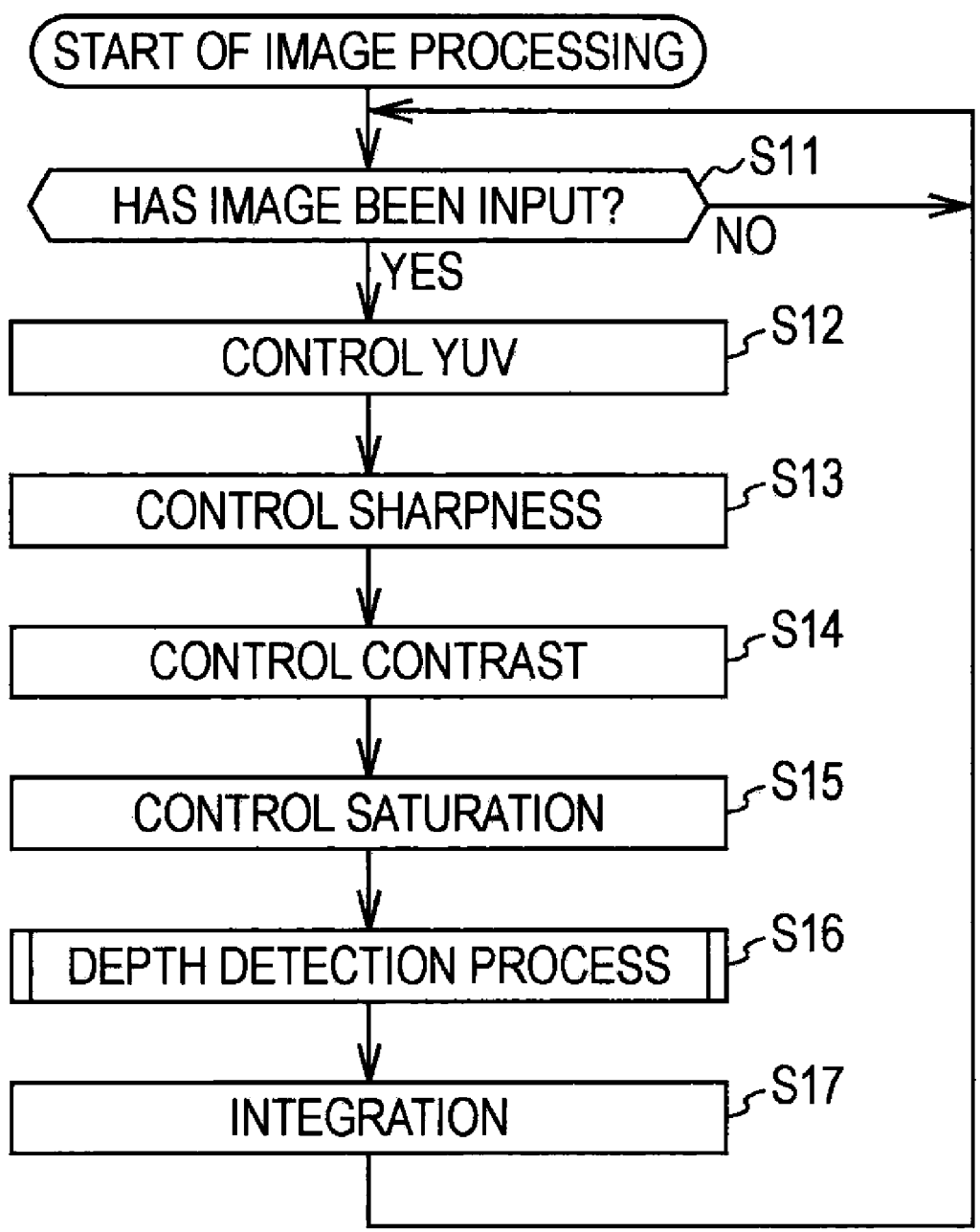
FIG. 6 is a flowchart illustrating image processing performed by the image processing apparatus of FIG. 1.

The description of the flowchart of FIG. 6 is now resumed.

When the depth generation process in step S36 in the flowchart of FIG. 7 is terminated, the depth detection process in step S16 in the flowchart of FIG. 6 is terminated, and the process proceeds to step S17.

In step S17, the integration section 12 integrates the brightness signal Y of the input image, the sharpness-enhanced brightness signal Ys, the contrast-enhanced brightness signal Yc, and the saturation-enhanced color difference signals Uc, Vc on the basis of the depth value d, and outputs a resulting integrated signal. More specifically, the integration section 12 performs calculation represented by the following formulas (6) to (8) to generate an output image P' on the basis of a new brightness signal Y' and new color difference signals U', V' corresponding to the depth value d, and outputs the output image P'.

$$Y' = (1-\alpha) \times Y + \alpha \times (\beta \times Y_s + \gamma \times Y_c) \quad (6)$$

$$U' = (1-\alpha) \times U + \alpha \times U_c \quad (7)$$

$$V' = (1-\alpha) \times V + \alpha \times V_c \quad (8)$$

Figure 14A:
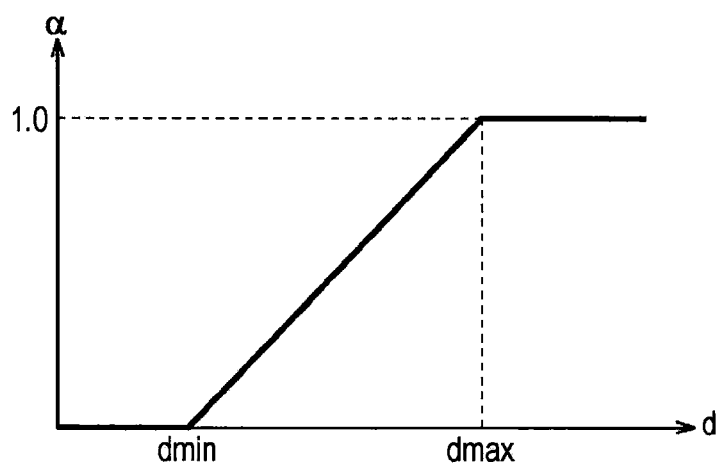
FIG. 14A illustrates the relationship between a depth value d and a coefficient $\alpha$.
Figure 14B:
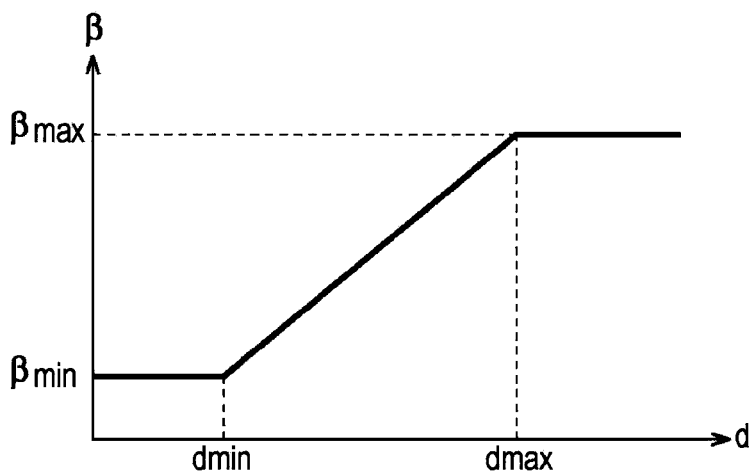
FIG. 14B illustrates the relationship between the depth value d and a coefficient $\beta$.
Figure 14C:
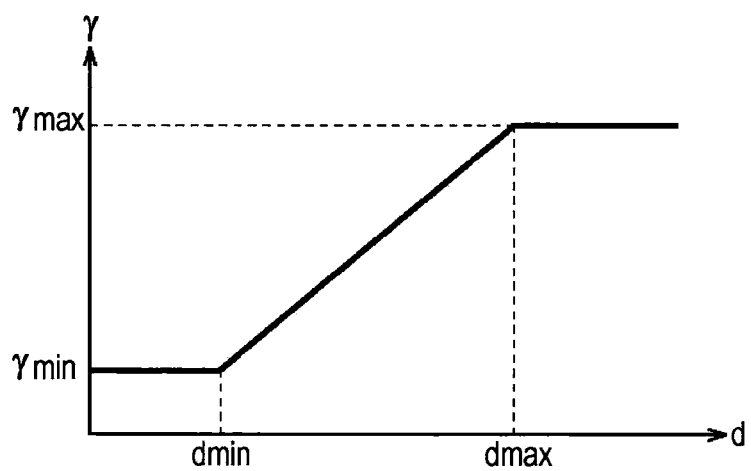
FIG. 14C illustrates the relationship between the depth value d and a coefficient $\gamma$.

In the formulas, α represents a coefficient set in correspondence with the depth value d as shown in FIG. 14A, β represents a coefficient set in correspondence with the depth value d as shown in FIG. 14B, and γ represents a coefficient set in correspondence with the depth value d as shown in FIG. 14C.

The coefficient α takes a value from 0 to 1.0, and varies linearly with the depth value d in the input image in a range from a minimum value dmin to a maximum value dmax. The coefficient β takes a value from a minimum value βmin to a maximum value βmax, and varies linearly with the depth value d in the input image in a range from the minimum value dmin to the maximum value dmax. The coefficient γ takes a value from a minimum value γmin to a maximum value γmax, and varies linearly with the depth value d in the input image in a range from the minimum value dmin to the maximum value dmax.

As the depth value d of each pixel is greater, all the coefficients α, β, γ are greater. Therefore, the brightness signal Y' is affected by the sharpness-enhanced brightness signal Ys and the contrast-enhanced brightness signal Yc more significantly. Also, both the color difference signals U', V' are affected by the color difference signals Uc, Vc more significantly. Thus, the image processing apparatus 1 processes the input image P to output a well-defined output image P' in which the contrast and the sharpness are enhanced and which gives a greater sense of depth.

As the depth value d of each pixel is smaller, on the other hand, all the coefficients α, β, γ are smaller. Therefore, the brightness signal Y' is affected by the brightness signal Y in the input image P more significantly. Also, both the color difference signals U', V' are affected by the color difference signals U, V in the input image P more significantly. Thus, the image processing apparatus 1 processes the input image P to a smaller degree to output an output image P' which is almost the same as the input image P.

Consequently, it is possible to give an appropriate sense of depth to the input image in accordance with the depth value d.

Figure 15:
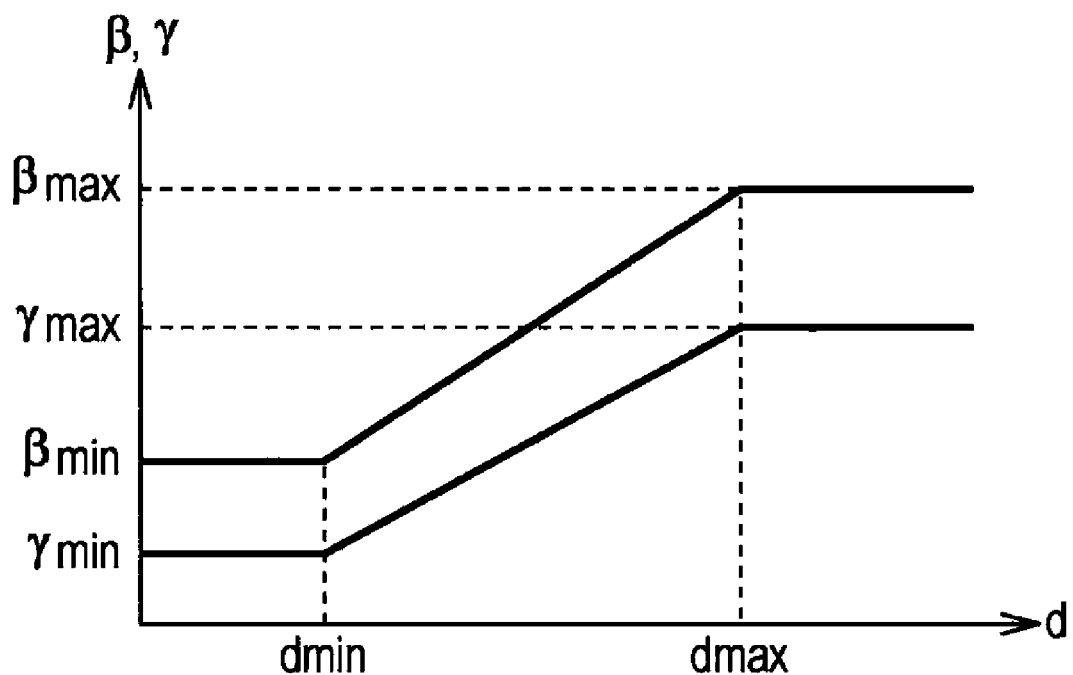
FIG. 15 illustrates other relationship between the depth value d and the coefficients $\beta$, $\gamma$.

The minimum values βmin, γmin and the maximum values βmax, γmax of the coefficients β, γ, respectively, may be set to different values as shown in FIG. 15 so as to adjust the degree to which the sharpness-enhanced brightness signal Ys and the contrast-enhanced brightness signal Yc affect the brightness signal Y'. In the example shown in FIG. 15, the minimum values βmin, γmin are 0.2 and 0.1, respectively, and the maximum values βmax, γmax are 0.6 and 0.4, respectively.

The coefficients β, γ may be defined by the formula γ=1−β, for example. This setting makes it possible to restrict the degree to which the sharpness-enhanced brightness signal Ys and the contrast-enhanced brightness signal Yc affect the brightness signal Y' to a degree.

According to the present invention, it is possible to appropriately set a depth value to each pixel in an image on the basis of the brightness signals for bright and dark areas and the saturation based on the color difference signal. This makes it possible to appropriately set a depth value to even pixels in a dark area or a flat area in an image, and to process the image pixel by pixel in accordance with the depth value, for example.

The sequence of processes discussed above may be executed by means of software as well as by means of hardware. In the case where the sequence of processes is executed by means of software, a program constituting the software is installed from a storage medium onto a computer incorporating dedicated hardware, or onto a general-purpose personal computer, for example, which is capable of executing various functions when various programs are installed.

FIG. 16 shows an exemplary configuration of a general-purpose personal computer. The personal computer includes a built-in CPU (Central Processing Unit) 1001. An input/output interface 1005 is connected to the CPU 1001 via a bus 1004. A ROM (Read Only Memory) 1002 and a RAM (Random Access Memory) 1003 are connected to the bus 1004.

To the input/output interface 1005, an input section 1006 including an input device such as a keyboard, a mouse, etc., for allowing a user to input an operation command, an output section 1007 for outputting a process operation screen and a resulting processed image to a display device, a storage section 1008 including a hard disk drive or the like for storing a program and various data, and a communication section 1009 including a LAN (Local Area Network) adaptor or the like for executing a communication process via a network, typically the Internet, are connected. A drive 1010 for reading data from and writing data into a removable medium 1011 such as a magnetic disk (including a flexible disk), an optical disk (including a CD-ROM (Compact Disc-Read Only Memory) and a DVD (Digital Versatile Disc)), a magneto-optical disk (including an MD (Mini Disc)), or a semiconductor memory is also connected to the input/output interface 1005.

The CPU 1001 executes various processes in accordance with a program stored in the ROM 1002 or a program read from the removable medium 1011 such as a magnetic disk, an optical disk, a magneto-optical disk, or a semiconductor memory, installed onto the storage section 1008, and loaded from the storage section 1008 into the RAM 1003. The RAM 1003 also stores data necessary for the CPU 1001 to execute the various processes as appropriate.

Steps defining the program stored in the storage medium may be performed chronologically in accordance with the order described herein, or may be executed not necessarily chronologically but in parallel or individually.

The present application contains subject matter related to that disclosed in Japanese Priority Patent Application JP 2008-240335 filed in the Japan Patent Office on Sep. 19, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    focus information extraction means for extracting, for each pixel of an input image, a high-frequency component as focus information from a brightness signal for a neighboring pixel;
    region integration means for integrating, for each pixel, the focus information on the neighboring pixel to generate integrated focus information;
    dark area processing means for replacing a value of the focus information on each pixel with a value obtained on the basis of a value of the focus information on the neighboring pixel that is greater than the value of the focus information on that pixel to generate dark area focus information on the input image;

illumination component extraction means for integrating the brightness signal for each pixel with the brightness signal for the neighboring pixel to extract an illumination component;

bright area/dark area integration means for calculating a depth value of each pixel through a product-sum operation of the integrated focus information and the dark area focus information using a coefficient based on the illumination component;

normalization means for normalizing the depth value of each pixel;

tone curve control means for controlling the depth value normalized by the normalization means in accordance with a tone curve;

saturation detection means for detecting a saturation of each pixel; and saturation control means for controlling the depth value that has been controlled in accordance with the tone curve by the tone curve control means on the basis of the saturation.

2. The image processing apparatus according to claim 1, further comprising:

perspective control means for controlling, for each pixel of the input image, a brightness and a color difference signal on the basis of a coefficient based on the depth value that has been controlled in accordance with the tone curve by the tone curve control means.

3. The image processing apparatus according to claim 2, further comprising:

sharpness control means for controlling a sharpness of the brightness;

contrast control means for controlling a contrast of the brightness; and color difference control means for controlling a color difference signal for each pixel, wherein the perspective control means controls the brightness on the basis of the coefficient based on the depth value using the brightness of each pixel, the brightness controlled by the sharpness control means, and the brightness controlled by the contrast control means, and controls the color difference signal on the basis of the coefficient based on the depth value using the color difference signal and the color difference signal controlled by the color difference control means.

4. An image processing method comprising the steps of:

extracting, for each pixel of an input image, a high-frequency component as focus information from a brightness signal for a neighboring pixel;

integrating, for each pixel, the focus information on the neighboring pixel to generate integrated focus information;

replacing a value of the focus information on each pixel with a value obtained on the basis of a value of the focus information on the neighboring pixel that is greater than the value of the focus information on that pixel to generate dark area focus information on the input image;

integrating the brightness signal for each pixel with the brightness signal for the neighboring pixel to extract an illumination component;

calculating a depth value of each pixel through a product-sum operation of the integrated focus information and the dark area focus information using a coefficient based on the illumination component;

normalizing the depth value of each pixel;

controlling the depth value normalized in the normalization step in accordance with a tone curve;

detecting a saturation of each pixel; and controlling the depth value that has been controlled in accordance with the tone curve in the tone curve control step on the basis of the saturation.

5. A non-transitory computer-readable storage medium encoded with instructions, which when executed on a processor, perform a method, the method comprising:

extracting, for each pixel of an input image, a high-frequency component as focus information from a brightness signal for a neighboring pixel;

integrating, for each pixel, the focus information on the neighboring pixel to generate integrated focus information;

replacing a value of the focus information on each pixel with a value obtained on the basis of a value of the focus information on the neighboring pixel that is greater than the value of the focus information on that pixel to generate dark area focus information on the input image;

integrating the brightness signal for each pixel with the brightness signal for the neighboring pixel to extract an illumination component;

calculating a depth value of each pixel through a product-sum operation of the integrated focus information and the dark area focus information using a coefficient based on the illumination component;

normalizing the depth value of each pixel;

controlling the depth value normalized in the normalization step in accordance with a tone curve;

detecting a saturation of each pixel; and controlling the depth value that has been controlled in accordance with the tone curve in the tone curve control step on the basis of the saturation.

6. An image processing apparatus comprising:

a processor; and a memory coupled to the processor, the memory including a plurality of sections configured to be executed by the processor, the memory including:

a focus information extraction section configured to extract, for each pixel of an input image, a high-frequency component as focus information from a brightness signal for a neighboring pixel;

a region integration section configured to integrate, for each pixel, the focus information on the neighboring pixel to generate integrated focus information;

a dark area processing section configured to replace a value of the focus information on each pixel with a value obtained on the basis of a value of the focus information on the neighboring pixel that is greater than the value of the focus information on that pixel to generate dark area focus information on the input image;

an illumination component extraction section configured to integrate the brightness signal for each pixel with the brightness signal for the neighboring pixel to extract an illumination component;

a bright area/dark area integration section configured to calculate a depth value of each pixel through a product-sum operation of the integrated focus information and the dark area focus information using a coefficient based on the illumination component;

a normalization section configured to normalize the depth value of each pixel;

a tone curve control section configured to control the depth value normalized by the normalization section in accordance with a tone curve;

a saturation detection section configured to detect a saturation of each pixel; and a saturation control section configured to control the depth value that has been controlled in accordance with the tone curve by the tone curve control section on the basis of the saturation.

7. The image processing apparatus according to claim 1, wherein the focus information extraction means extracts the high-frequency component by applying a horizontal filtering process to obtain a first component, by applying a vertical filtering process to obtain a second component, and comparing the absolute value of the first component to the absolute value of the second component.

8. The image processing apparatus according to claim 1, wherein the saturation control means controls the depth value based on a coefficient that varies linearly with the saturation.

9. The image processing method according to claim 4, further comprising:
controlling, for each pixel of the input image, a brightness and a color difference signal on the basis of a coefficient based on the depth value that has been controlled in accordance with the tone curve by the tone curve control means.

10. The image processing method according to claim 9, further comprising:
controlling a sharpness of the brightness;
controlling a contrast of the brightness; and
controlling a color difference signal for each pixel,
wherein the brightness is controlled based on the coefficient based on the depth value using the brightness of each pixel, the sharpness, and the contrast, and
wherein the color difference is controlled based on the coefficient based on the depth value using the color difference signal and the controlled color difference signal.

11. The image processing method according to claim 4, wherein the high-frequency component is extracted by applying a horizontal filtering process to obtain a first component, by applying a vertical filtering process to obtain a second component, and comparing the absolute value of the first component to the absolute value of the second component.

12. The image processing method according to claim 4, wherein the depth value is controlled based on a coefficient that varies linearly with the saturation.

13. The computer-readable storage medium according to claim 5, the method further comprising:
controlling, for each pixel of the input image, a brightness and a color difference signal on the basis of a coefficient based on the depth value that has been controlled in accordance with the tone curve by the tone curve control means.

14. The computer-readable storage medium according to claim 13, the method further comprising:
controlling a sharpness of the brightness;
controlling a contrast of the brightness; and
controlling a color difference signal for each pixel,
wherein the brightness is controlled based on the coefficient based on the depth value using the brightness of each pixel, the sharpness, and the contrast, and
wherein the color difference is controlled based on the coefficient based on the depth value using the color difference signal and the controlled color difference signal.

15. The computer-readable storage medium according to claim 5, wherein the high-frequency component is extracted by applying a horizontal filtering process to obtain a first component, by applying a vertical filtering process to obtain a second component, and comparing the absolute value of the first component to the absolute value of the second component.

16. The computer-readable storage medium according to claim 5, wherein the depth value is controlled based on a coefficient that varies linearly with the saturation.

17. The image processing apparatus according to claim 6, the memory further comprising:
a perspective control section configured to control, for each pixel of the input image, a brightness and a color difference signal on the basis of a coefficient based on the depth value that has been controlled in accordance with the tone curve by the tone curve control means.

18. The image processing apparatus according to claim 17, the memory further comprising:
a sharpness control section configured to control a sharpness of the brightness;
a contrast control section configured to control a contrast of the brightness; and
a color difference control section configured to control a color difference signal for each pixel,
wherein the perspective control section controls the brightness on the basis of the coefficient based on the depth value using the brightness of each pixel, the brightness controlled by the sharpness control section, and the brightness controlled by the contrast control section, and controls the color difference signal on the basis of the coefficient based on the depth value using the color difference signal and the color difference signal controlled by the color difference control section.

19. The image processing apparatus according to claim 1, wherein the focus information extraction means extracts the high-frequency component by applying a horizontal filtering process to obtain a first component, by applying a vertical filtering process to obtain a second component, and comparing the absolute value of the first component to the absolute value of the second component.

20. The image processing apparatus according to claim 1, wherein the saturation control means controls the depth value based on a coefficient that varies linearly with the saturation.

* * * * *